United States Patent [19]
Ishizaka

[11] Patent Number: 5,999,298
[45] Date of Patent: Dec. 7, 1999

[54] ELECTROABSORPTION OPTICAL INTESITY MODULATOR HAVING A PLURALITY OF ABSORPTION EDGE WAVELENGTHS

[75] Inventor: Masashige Ishizaka, Tokyo, Japan

[73] Assignee: NEC Corporation, Tokyo, Japan

[21] Appl. No.: 08/933,012

[22] Filed: Sep. 18, 1997

[30] Foreign Application Priority Data

Sep. 20, 1996 [JP] Japan .................................. 8-249527

[51] Int. Cl.$^6$ ................................................. H04B 10/04
[52] U.S. Cl. ......................... 359/154; 359/181; 359/248; 385/131; 385/5
[58] Field of Search .................................. 359/180, 181, 359/188, 163, 245, 248, 154; 385/5, 14, 131

[56] References Cited

U.S. PATENT DOCUMENTS

| | | | |
|---|---|---|---|
| 5,325,225 | 6/1994 | Suzaki et al. | 359/187 |
| 5,528,413 | 6/1996 | Ishimura | 359/248 |
| 5,663,824 | 9/1997 | Koch et al. | 359/184 |
| 5,754,714 | 5/1998 | Suzuki et al. | 385/5 |

FOREIGN PATENT DOCUMENTS

| | | |
|---|---|---|
| 6-181366 | 6/1994 | Japan . |
| 7-230066 | 8/1995 | Japan . |
| 9-311304 | 12/1997 | Japan . |

OTHER PUBLICATIONS

Japanese Office Action dated Jun. 16, 1998 with English Language translation of Japanese Examiner's comments.
Komatsu, K., et al., "1.55 $\mu$m Wavelength—2.4 Gb/s InGaP/InP Franz–Keldysh Type Optical Modulators Grown by Selective Metal–Organic Vapor Phase Epitaxy," *IEICE*, Aug. 15, 1993.

Ooi, H., et al., "10Gb/s SMF Transmission Characteristics using Modulator Integrated DFB Laser," *IEICE,*, p. 535, Mar. 13, 1996.

Ishizaka, M., et al., "Analysis on Blue Chirp Mechanism and the Torlerance of a Modulator Integrated DFB Laser," *ICICE*, p. 236, Aug. 30, 1996.

K. Yamada, et al., "Low–chirp, low–polarization dependent characteristics of electroabsoption optical intensity modulator with an InGaAsP bulk," *IEICE, Technical*, vol. 1, p. 349, 1995.

K. Morito, et al., "10 Gb/s transmission over 100km of standard fiber with a blue chirp modulator integrated DFB laser," *IEICE, Technical*, vol. 1, p. 301, 1995.

*Primary Examiner*—Rafael Bacares
*Attorney, Agent, or Firm*—Whitham, Curtis & Whitham

[57] ABSTRACT

In an electroabsorption optical intensity modulator, a semiconductor buffer, a first semiconductor cladding layer, a semiconductor optical absorption layer, a second semiconductor cladding layer and a semiconductor cap layer are formed on a semiconductor substrate. Also, a first electrode is formed on the second semiconductor cap layer, and a second electrode is formed on a second surface of the semiconductor substrate. The semiconductor optical absorption layer includes a first semiconductor optical absorption layer element having a first absorption edge wavelength and a second semiconductor optical absorption layer element having a second absorption edge wavelength different from the first absorption edge wavelength.

7 Claims, 7 Drawing Sheets

ELECTROABSORPTION OPTICAL INTESITY MODULATOR HAVING A PLURALITY OF ABSORPTION EDGE WAVELENGTHS

BACKGROUND OF THE INVENTION

1. Field of the Invention

The present invention relates to an electroabsorption optical intensity modulator.

2. Description of the Related Art

In a high speed optical communication system for long distance, semiconductor laser diodes have been broadly used to adopt a direct modulation method. In this system, however, a wavelength chirping phenomenon is generated during modulation, so that the waveform of a transmitted light signal on an optical fiber is deteriorated. This chirping phenomenon becomes critical as the transmission rate becomes larger and the transmission distance becomes longer. Particularly, in a communication system using 1.3 $\mu$m zero dispersion fibers, even when a light source of a 1.55 $\mu$m band having a low loss of fiber transmission is used to increase the transmission distance, this distance is limited by the dispersion limit due to the chirping phenomenon.

In order to reduce the chirping phenomenon, an external modulation system where an external optical modulator is used has been developed. As the external optical modulator, there are a dielectric modulator using $LiNbO_3$ or the like and a semiconductor modulator using InP, GaAs or the like. The semiconductor modulator has an advantage in that the semiconductor modulator can be integrated with other optical elements such as a semiconductor laser diode and an optical amplifier and other electronic circuits such as a field effect transistor (FET) circuit, and also, the semiconductor modulator can be small in size and low in power supply voltage.

The semiconductor modulator is further divided into an electroabsorption optical intensity modulator and a Mach-Zendor type modulator. In the electroabsorption optical intensity modulator, the Franz-Keldysh effect for a bulk semiconductor or the quantum confined stark effect for multiple quantum wells (MQWs) is used. That is, the absorption edge is shifted toward the longer wavelength direction by applying an electric field to the modulator, so that the absorption coefficient is changed, thus modulating a light intensity. On the other hand, in the Mach-Zendor type modulator, the Pockets effect (electrooptic effect) for a bulk semiconductor or the quantum confined stark effect for MQWs is used. That is, the infractive index is changed by applying an electric field to the modulator.

The electroabsorption optical intensity modulator can remarkably reduce the waveform chirping phenomenon, as compared with the direct modulation system by the semiconductor laser diode; however, the waveform chirping amount cannot be zero. On the other hand, in the Mach-Zendor type modulator, the waveform chirping amount can be zero in principle; however, the Mach-Zendor type modulator is complex in structure and driving method due to the interference type structure where a non-linear waveguide structure is adopted.

A prior art electroabsorption optical intensity modulator includes a semiconductor buffer, a first semiconductor cladding layer, a semiconductor optical absorption layer, a second semiconductor cladding layer and a semiconductor cap layer are formed on a semiconductor substrate. Also, a first electrode is formed on the second semiconductor cap layer, and a second electrode is formed on a second surface of the semiconductor substrate. In the prior art electroabsorption optical intensity modulator, however, a positive chirping is usually generated. In addition, if the dewavelength between an incident light and the absorption edge wavelength of the semiconductor optical absorption layer is reduced, a negative chirping operation can be carried out. In this case, however, the absorption coefficient is increased, so that a sufficient output cannot be obtained at a signal ON state. This will be explained later in detail.

Recently, in the electroabsorption optical intensity modulator a prebias applying method is adopted to reduce the waveform chirping phenomenon, thus overcoming the limit of transmission distance caused by the dispersion. In a 10 Gb/s transmission, after a definite bias voltage is applied to the modulator, an electrical signal is superposed thereon, to enhance the duration of fiber dispersion, thus overcoming the limit of dispersion of transmission distance (see: K. Yamada et al., "Low-chirp, Low-polarization Dependent Characteristics of Electroabsorption Optical Intensity Modulator with an InGaAsP Bulk" IEICE, Technical Vol. 1, p. 349, C-349, 1995). Also, in a 10 Gb/s transmission, a definite bias voltage of 1.1V is applied to the modulator integrated with a distributed feedback (DFB) laser diode, to enhance the duration of fiber dispersion, thus obtaining a transmission distance of 100 km (see: K. Morita et al., "10 Gb/s Transmission over 100 km of Standard Fiber with a Blue Chirp Modulator Integrated DFB laser", IEILE, Technical Vol. 1, p. 301, C-301, 1995). However, when a bias voltage is applied to the modulator, an outgoing light power at a signal ON state is reduced, and thus, the signal ON/OFF ratio is deteriorated. In addition, a circuit for generating such a bias voltage is required, thus making the optical system complex.

SUMMARY OF THE INVENTION

It is an object of the present invention to realize a negative chirp modulation operation in an electroabsorption optical intensity modulator without applying a bias voltage thereto and without increasing the absorption loss.

According to the present invention, in an electroabsorption optical intensity modulator, a semiconductor buffer, a first semiconductor cladding layer, a semiconductor optical absorption layer, a second semiconductor cladding layer and a semiconductor cap layer are formed on a semiconductor substrate. Also, a first electrode is formed on the second semiconductor cap layer, and a second electrode is formed on a second surface of the semiconductor substrate. The semiconductor optical absorption layer includes a first semiconductor optical absorption layer element having a first absorption edge wavelength and a second semiconductor optical absorption layer element having a second absorption edge wavelength different from the first absorption edge wavelength.

Thus, when an electric field applied to the modulator, i.e., to the semiconductor optical absorption layer is increased, a refractive index of the semiconductor optical absorption layer for an incident light is decreased, and also an absorption coefficient of the semiconductor optical absorption layer for the incident light increased.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of the preferred embodiment, the characteristics of the above-mentioned prior art electroabsorption optical intensity modulator will be explained with reference to FIGS. 1 and 2.

Figure 1:
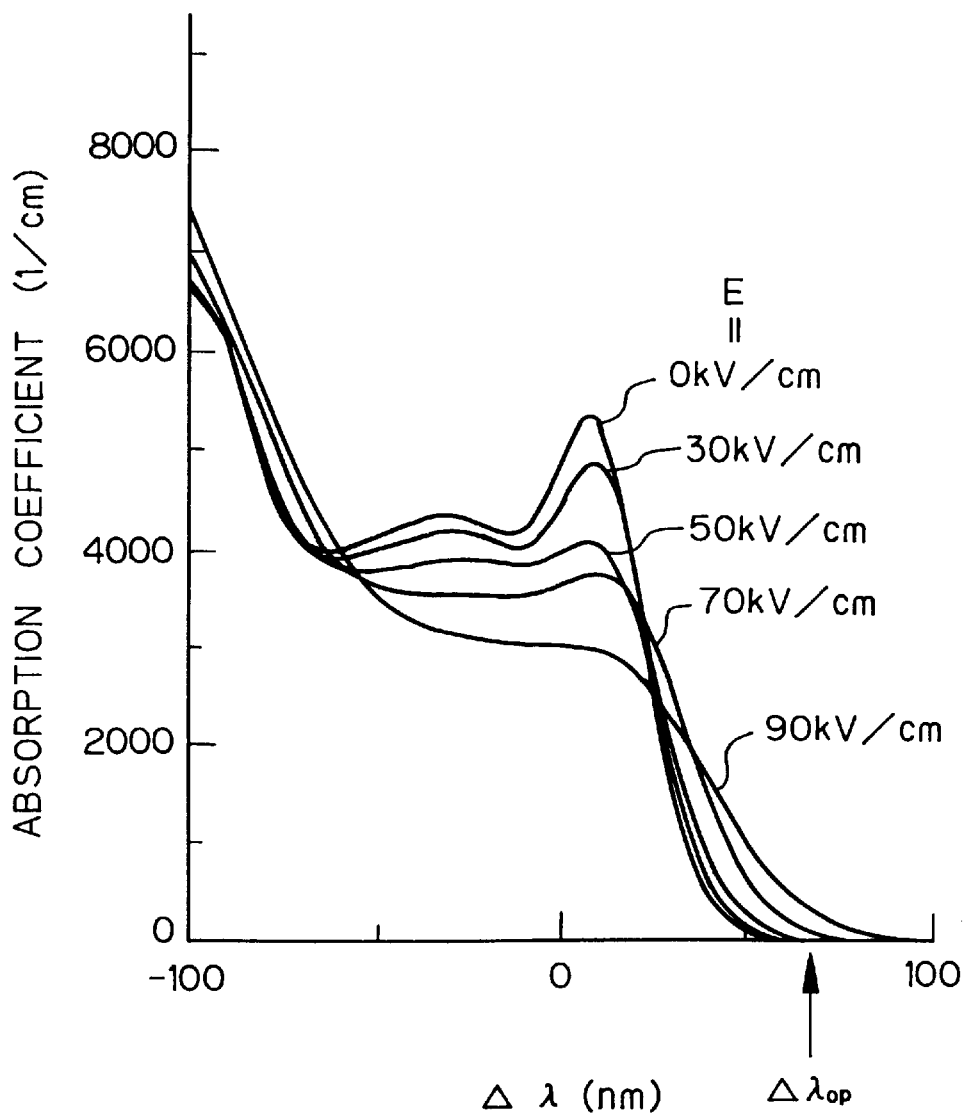
FIG. 1 is a graph showing absorption coefficient and applied voltage characteristics of the prior art MQW optical absorption layer.
Figure 2:
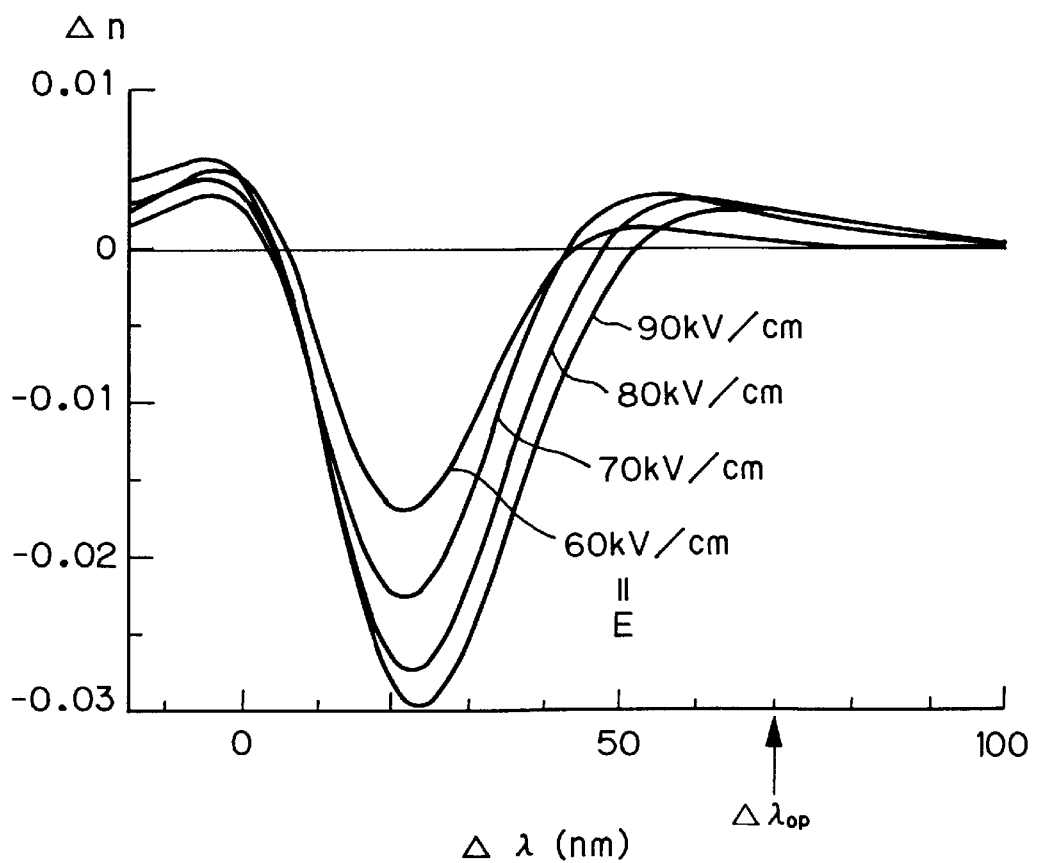
FIG. 2 is a graph showing refractive index change and applied voltage characteristics of the prior art MQW optical absorption layer.

FIG. 1 is a graph showing absorption coefficient and applied voltage characteristics of the prior art MQW optical absorption layer, and FIG. 2 is a graph showing refractive index change and applied voltage characteristics of the prior art MQW optical absorption layer. In FIGS. 1 and 2, an electric field E within the prior art MQW optical absorption layer is changed from 0 kV/cm to 90 kV/cm.

As shown in FIG. 1, when E=90 kV/cm, if a wavelength difference (detuning) $\Delta\lambda_{op}$ between the wavelength of the incident light signal and the absorption edge wavelength $\lambda_g$ of the MQW optical absorption layer 41 is 70 nm, a signal OFF state can be obtained. In this case, refractive index change $\Delta n$ is changed as shown in FIG. 2.

The chirping amount at a signal ON/OFF transition state is proportional to $\Delta n/\Delta\alpha$ where $\Delta\alpha$ is a change of the absorption coefficient. Therefore, usually, as shown in FIGS. 1 and 2, since $\Delta n>0$ and $\Delta\alpha>0$, a positive chirping is usually generated. In addition, if the detuning $\Delta\lambda_{op}$ is reduced, a negative chirping operation can be carried out. In this case, however, the absorption coefficient is increased, so that a sufficient output cannot be obtained at a signal ON state.

Figure 3:
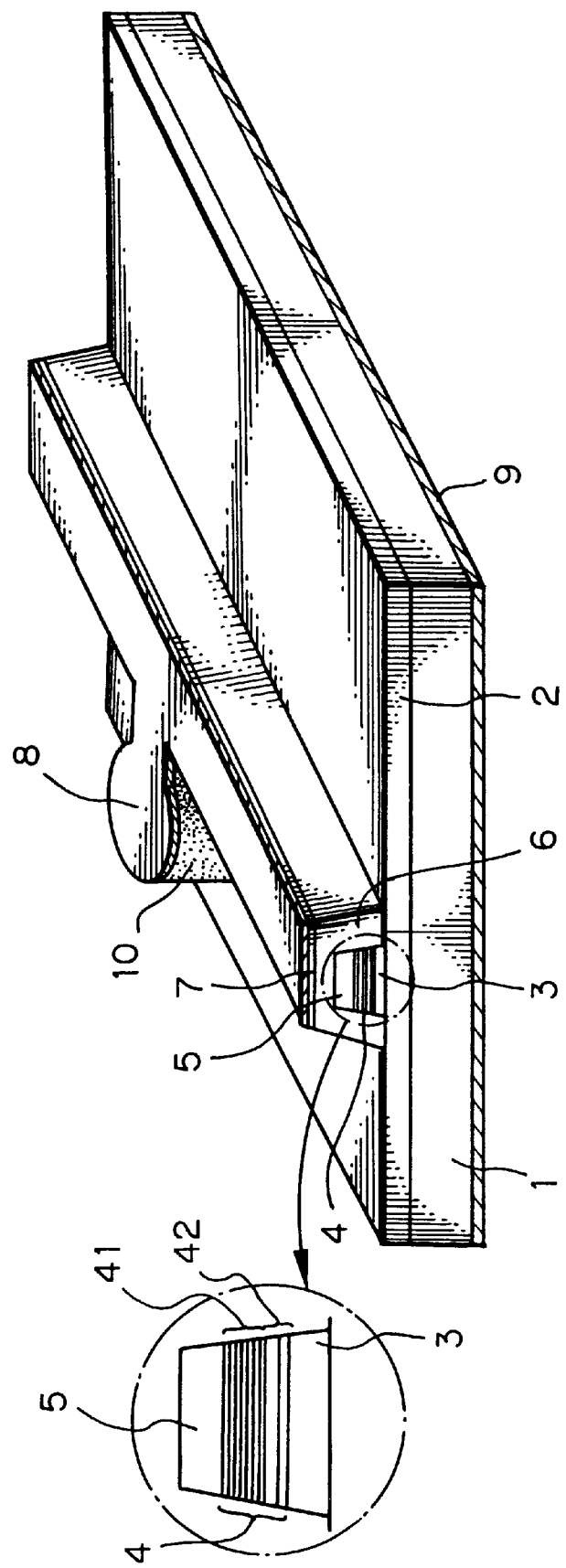
FIG. 3 is a perspective view illustrating an embodiment of the electroabsorption optical intensity modulator according to the present invention.

In FIG. 3, which illustrates an embodiment of the electroabsorption optical intensity modulator according to the present invention, reference numeral 1 designates an N-type (100) face InP substrate on which an about 0.8 thick InP buffer layer 2 having an electron concentration of about $1\times10^{17}$ cm$^{-3}$, an about 700 Å thick N-type InP cladding layer 3 having an electron concentration of about $1\times10^{17}$ cm$^{-3}$, an MQW optical absorption layer 4 and an about 1600 Å thick P-type InP cladding layer 5 having a hole concentration of about $5\times10^{17}$ cm$^{-3}$ are sequentially formed. Also, a mesa strip formed by the P-type InP cladding layer 5, the MQW optical absorption layer 4 and the N-type InP cladding layer 3 is covered by an about 1.6 $\mu$m thick P-type InP embedding layer 6 having a hole concentration of about $5\times10^{17}$ cm$^{-3}$.

The MQW optical absorption layer 4 is formed by an MQW optical absorption layer 41 consisting of 8 periods of InGaAsP/InGaAsP having a carrier concentration of about $5\times10^{15}$ cm$^{-3}$ and an absorption edge wavelength $\lambda_{g1}$ of 1.48 $\mu$m, and an MQW optical absorption layer 41 consisting of 2 periods of InGaAsP/InGaAsP having a carrier concentration of about $5\times10^{15}$ cm$^{-3}$ and an absorption edge wavelength $\lambda_{g2}$ of 1.51 $\mu$m.

Also, an about 0.25 $\mu$m thick P-type InGaAs cap layer 7 having a hole concentration of about $1\times10^{19}$ cm$^{-3}$ is formed on the P-type InP embedding layer 6.

Further, a P-side Cr/Au Pad electrode 8 and an N-side Cr/Au electrode 9 are formed on front and back surfaces, respectively. In addition, a polyimide layer 10 is embedded under the P-side electrode 8, and a non-reflection coating layer (not shown) is formed on a cleavage surface of the modulator.

In the electroabsorption optical intensity modulator of FIG. 3, the absorption edge wavelength $\lambda_{g1}$(=1.48 $\mu$m) of the MQW optical absorption layer 41 is shorter than the absorption edge wavelength $\lambda_{g2}$(=1.51 $\mu$m) of the MQW optical absorption layer 42. In a non-bias voltage state where no voltage is applied between the P-side pad electrode 8 and the N-side electrode 9, when a light signal having a wavelength of 1.55 $\mu$m is incident to the modulator, this light signal is hardly absorped by the modulator, so that this light signal goes out therefrom. That is, an optical signal ON state is established. On the other hand, in a bias state where a voltage of 2V is applied between the P-side pad elctrode 8 and the N-side electrode 9, when a light signal having a wavelength of 1.55 $\mu$m is incident to the modulator, this light signal is absorbed by the modulator, an optical signal OFF state is established.

Figure 4:
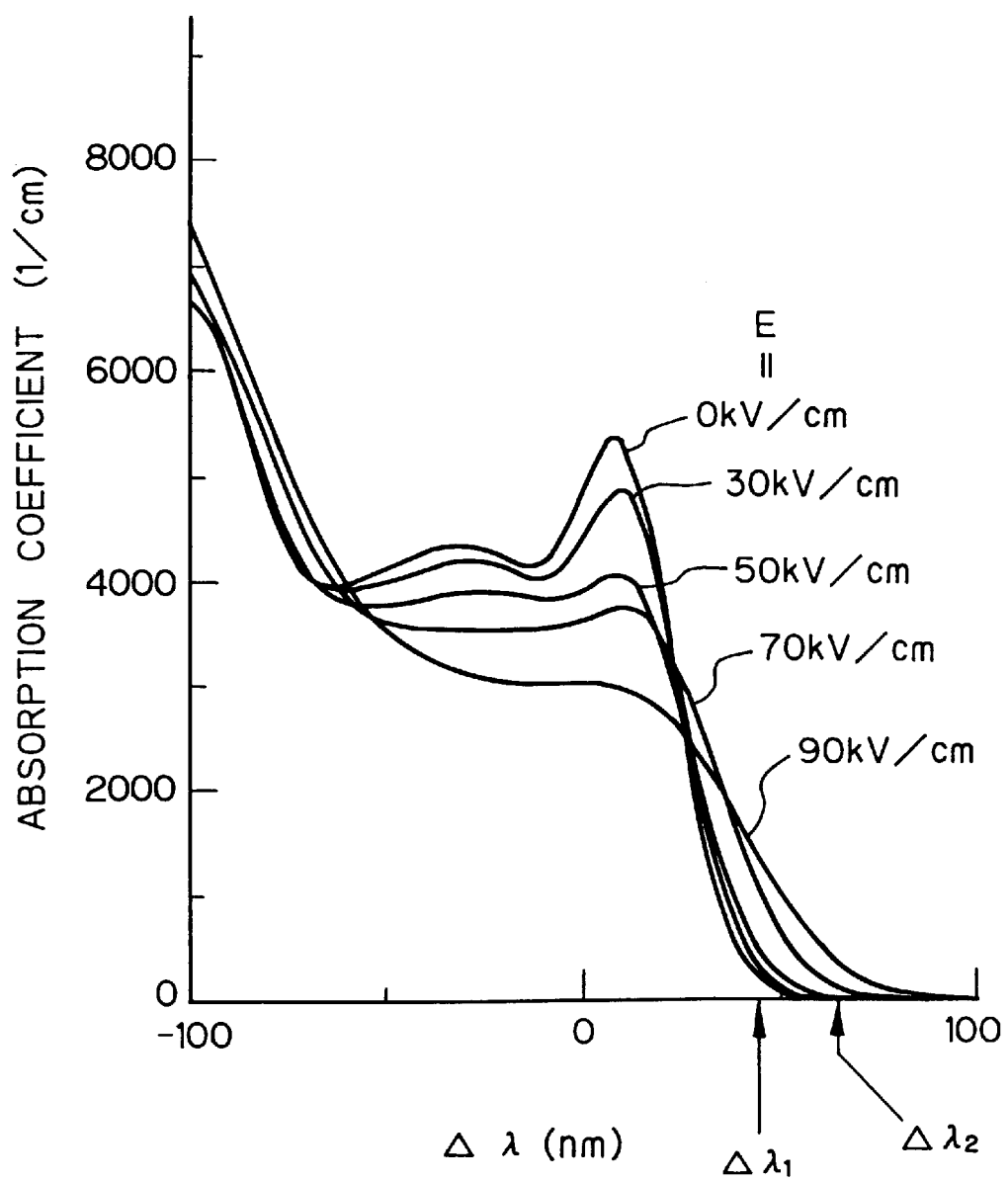
FIG. 4 is a graph showing absorption coefficient and applied voltage characteristics of the MQW optical absorption layer of FIG. 3.
Figure 5:
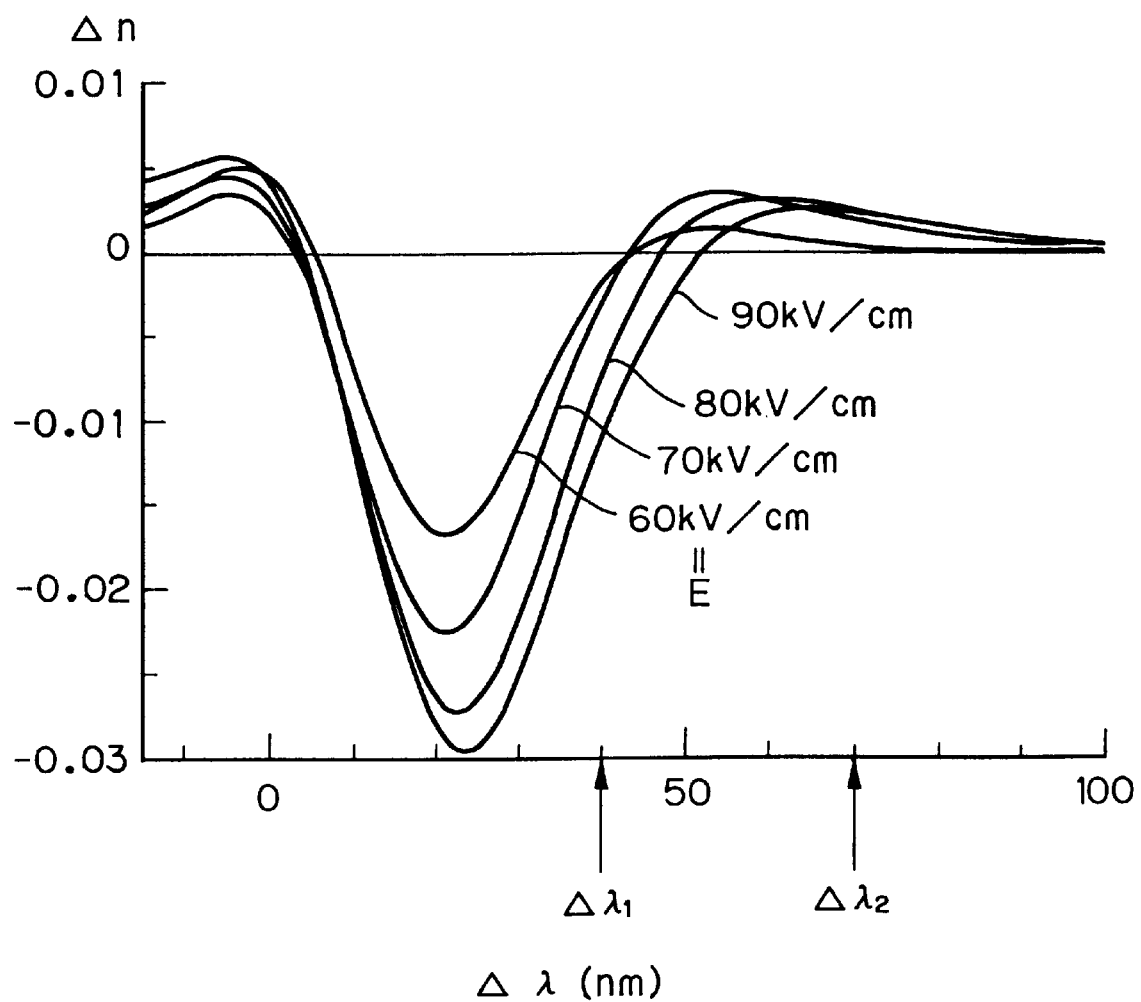
FIG. 5 is a graph showing refractive index change and applied voltage characteristics of the MQW optical absorption layer of FIG. 3.

FIG. 4 is a graph showing absorption coefficient and applied voltage characteristics of the MQW optical absorption layer 4 of FIG. 3, and FIG. 5 is a graph showing refractive index change and applied voltage characteristics of the MQW optical absorption layer 4 of FIG. 3. In FIGS. 4 and 5, note that, if the voltage applied between P-side pad electrode 8 and the N-side electrode 9 is changed from 0V to 2V, an electric field E within the MQW optical absorption layer 4 is changed from 0 kV/cm to 90 kV/cm.

As shown in FIGS. 4 and 5, when E=90 kV/cm, a detuning $\Delta\lambda_1$ between the wavelength of the incident light signal and the absorption edge wavelength $\lambda_{g1}$ of the MQW optical absorption layer 41 is $$\Delta\lambda_1=40\text{nm}.$$

Also, a refractive index change $\Delta n_1$ is $$\Delta n_1=-0.013$$

On the other hand, when E=90 kV/cm, a detuning $\Delta\lambda_2$ between the wavelength of the incident light signal and the absorption edge wavelength $\lambda_{g2}$ of the MQW optical absorption layer 42 is $$\Delta\lambda_2=70\text{nm}.$$

Also, a refractive index change $\Delta n_2$ is $$\Delta n_2=0.0025$$

In addition, a confinement coefficient $\Gamma_1$ for the incident light signal by the MQW optical absorption layer 41 is $$\Gamma_1 = 0.02$$

On the other hand, a confinement coefficient $\Gamma_2$ for the incident light signal by the MQW optical absorption layer 42 is $$\Gamma_2 = 0.1$$

Therefore, a phase change $\Delta\phi$ of the incident light signal caused by the change of the voltage applied to the P-side pad electrode 8 and the N-side electrode 9 from an OFF state to an ON state is $$\Delta\phi = 2\pi L(\Gamma_1 \cdot \Delta n_1 + \Gamma_2 \Delta n_2)/\lambda$$
$$= 2\pi L/\lambda \cdot (0.02 \cdot (-0.013) + 0.1 \cdot 0.0025))$$
$$= 2\pi L/\lambda \cdot (-0.0001) < 0$$

where
L is a length of the modulator, and
$\lambda$ is a wavelength of the incident light signal.
Since $\Delta\phi < 0$, a $\alpha$ parameter showing a chirping is $$\alpha = 2I \cdot \Delta I/\Delta\phi < 0$$

where
I is an intensity of the incident light signal, and
$\Delta I$ is a change of the intensity I.

Also, in a no bias state, i.e., in a signal ON state, the shorter the detuning $\Delta\lambda$, the larger the absorption coefficient. However, since the confinement coefficient $\Gamma_1$ for the incident light signal by the MQW optical absorption layer 41 is very small (=0.02), the MQW optical absorption layer 41 hardly contributes to the absorption loss in the signal ON state.

Thus, in the modulator of FIG. 3, a negative chirp modulation operation can be realized without applying a DC bias voltage to the P-side pad electrode 8 and the N-side electrode 9 in advance and without increasing the absorption loss.

Note that the polyimide layer 10 below the P-side pad electrode 8 is helpful in reducing the capacitance thereof. This makes the modulator of FIG. 3 operate at a high speed of an order of 10 Gb/s.

Also, an InGaAs/InP MQW optical absorption layer, a GaAs/AlGaAs MQW optical absorption layer or the like can be used instead of the InGaAsP/InGaAsP MQW optical absorption layer 4 of FIG. 3. In addition, the modulator of FIG. 3 can be applied to an InP bulk waveguide type electroabsorption optical intensity modulator.

Figure 6:
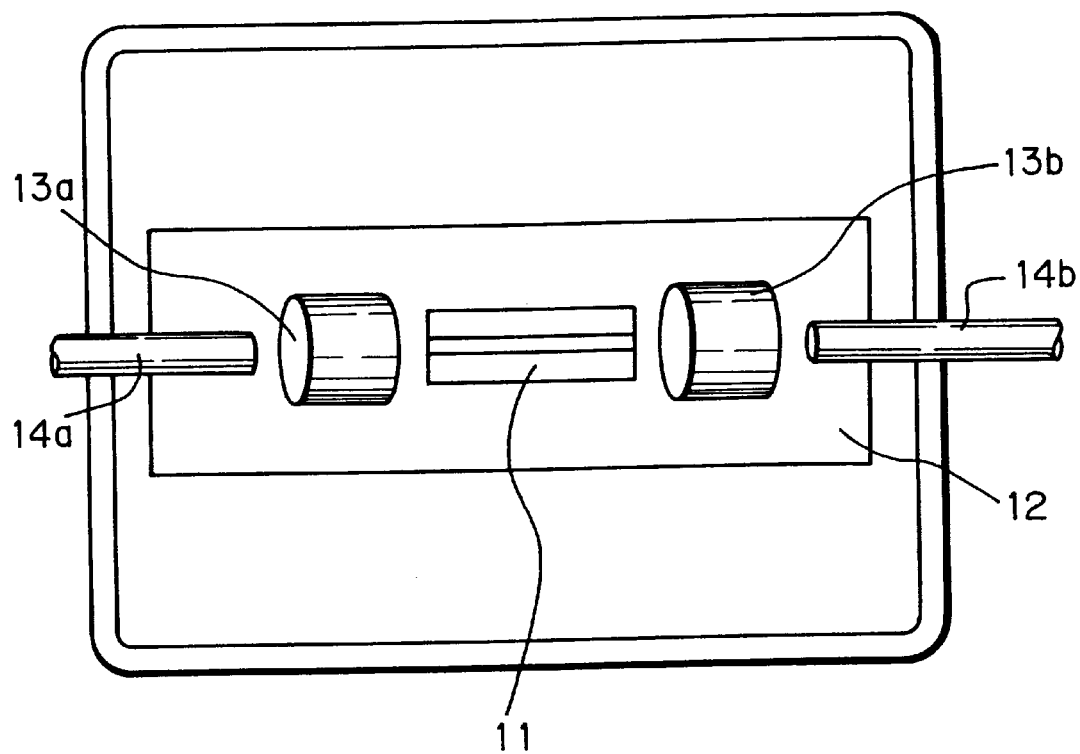
FIG. 6 is a diagram illustrating an optical communication module to which the modulator of FIG. 3 is applied.

In FIG. 6, which illustrates an optical communication module to which the modulator of FIG. 3 is applied, reference numeral 11 designates the modulator of FIG. 3 which is mounted in a sub mount 12. Also, aspherical lenses 13a and 13b are mounted in the sub mount 12 on the front and back sides of the modulator 11. Further, optical fibers 14a and 14b are mounted in the sub mount 12. The optical fiber 14a, the aspherical lens 13a, the modulator 11, the aspherical lens 13b and the optical fiber 14b are on one optical axis. By the optical communication module of FIG. 6, a high speed and low chirp signal can be easily produced at a low insertion loss.

Figure 7:
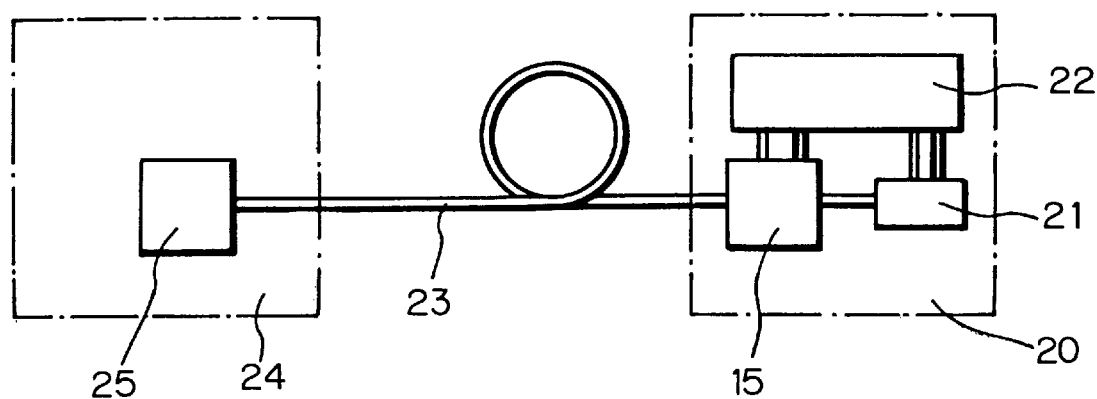
FIG. 7 is a diagram illustrating an optical communication system to which the optical communication module of FIG. 6 is applied.

In FIG. 7, which illustrates an optical communication system to which the optical communication module of FIG. 6 is applied, reference numeral 15 designates the optical communication module of FIG. 6 provided in a transmitter 20. The transmitter 20 also includes a light source 21 for generating a light signal and a driving circuit for driving the optical communication module 15 as well as the light source 22. On the other hand, a light signal generated from the optical communication module 15 is transmitted via an optical fiber 23 to a light receiving unit 25 of a receiver 24. By the optical communication system of FIG. 7, an optical transmission of 100 km or more can be carried out without relaying, since the deterioration of a signal by the dispersion of the optical fiber 23 is remarkably reduced by the negative chirping.

As explained hereinabove, according to the present invention, a negative chirp modulation operation can be realized without applying a DC bias voltage to the electrodes in advance and without increasing the absorption loss.

I claim:

1. An electroabsorption optical intensity modulator comprising:
   a semiconductor substrate;
   a semiconductor buffer layer formed on a first surface of said semiconductor substrate;
   a first semiconductor cladding layer formed on said semiconductor buffer layer,
   a semiconductor optical absorption layer formed on said first semiconductor cladding layer, said semiconductor optical absorption layer including a first semiconductor optical absorption layer element having a first absorption edge wavelength and a second semiconductor optical absorption layer element having a second absorption edge wavelength different from said first absorption edge wavelength;
   a second semiconductor cladding layer formed on said semiconductor optical absorption layer;
   a semiconductor cap layer formed on said second semiconductor cladding layer;
   a first electrode formed on said semiconductor cap layer; and
   a second electrode formed on a second surface of said semiconductor substrate.

2. The modulator as set forth in claim 1, wherein said first semiconductor optical absorption layer element is superposed on said second semiconductor optical absorption layer.

3. The modulator as set forth in claim 1, wherein each of said first and second optical absorption layer elements comprises a multiple quantum well structure.

4. An electroabsorption optical intensity modulator comprising:
   an N-type InP substrate;
   an N-type InP buffer layer formed on a first surface of said N-type InP substrate;
   an N-type InP cladding layer formed on said N-type InP buffer layer,
   a multiple quantum well optical absorption layer formed on said N-type InP cladding layer, said multiple quantum well optical absorption layer including a first multiple quantum well optical absorption layer element consisting of first periods of InGaAsP/InGaAsP having a first absorption edge wavelength and a second multiple quantum well optical absorption layer element consisting of second periods of InGaAsP/InGaAsP having a second absorption edge wavelength different from said first absorption edge wavelength;

a P-type InP cladding layer formed on said multiple quantum well optical absorption layer;

a P-type InGaAs cap layer formed on said P-type InP cladding layer;

a first electrode formed on said P-type InGaAs cap layer; and a second electrode formed on a second surface of said N-type TnP substrate.

5. The modulator as set forth in claim 4, wherein said first multiple quantum well optical absorption layer element is superposed on said second multiple quantum well optical absorption layer.

6. An optical communication module comprising:

a semiconductor electroabsorption optical intensity modulator;

a first light condensing means for condensing an incident light to said semiconductor absorption optical intensity modulator; and a second light condensing means for condensing an outgoing light from said semiconductor electroabsorption optical intensity modulator to an optical fiber;

said electroabsorption optical intensity modulator comprising:

a semiconductor substrate;

a semiconductor buffer layer formed on a first surface of said semiconductor substrate;

a first semiconductor cladding layer formed on said semiconductor buffer layer, a semiconductor optical absorption layer formed on said first semiconductor cladding layer, said semiconductor optical absorption layer including a first semiconductor optical absorption layer element having a first absorption edge wavelength and a second semiconductor optical absorption layer element having a second absorption edge wavelength different from said first absorption edge wavelength;

a second semiconductor cladding layer formed on said semiconductor optical absorption layer;

a semiconductor cap layer formed on said second semiconductor cap layer;

a first electrode formed on said semiconductor cap layer; and a second electrode formed on a second surface of said semiconductor substrate.

7. An optical communication system comprising a transmitter, a receiver and an optical means connected between said transmitter and said receiver, said transmitter comprising:

a semiconductor electroabsorption optical intensity modulator; a first light condensing means for condensing an incident light to said semiconductor absorption optical intensity modulator; and a second light condensing means for condensing an outgoing light from said semiconductor electroabsorption optical intensity modulator to said optical means;

said electroabsorption optical intensity modulator comprising:

a semiconductor substrate;

a semiconductor buffer layer formed on a first surface of said semiconductor substrate;

a first semiconductor cladding layer formed on said semiconductor buffer layer, a semiconductor optical absorption layer formed on said first semiconductor cladding layer, said semiconductor optical absorption layer including a first semiconductor optical absorption layer element having a first absorption edge wavelength and a second semiconductor optical absorption layer element having a second absorption edge wavelength different from said first absorption edge wavelength;

a second semiconductor cladding layer formed on said semiconductor optical absorption layer;

a semiconductor cap layer formed on said second semiconductor cladding layer;

a first electrode formed on said semiconductor cap layer; and a second electrode formed on a second surface of said semiconductor substrate.

* * * * *